United States Patent
Ahn et al.

(10) Patent No.: US 6,707,450 B2
(45) Date of Patent: Mar. 16, 2004

(54) TOUCH PANEL WITH POLARIZER, FLAT PANEL DISPLAY WITH THE TOUCH PANEL AND MANUFACTURING METHOD THEREOF

(75) Inventors: Young-Soo Ahn, Seoul (KR); Tae-Ho Cheon, Seoul (KR)

(73) Assignee: ATouch Co., Ltd., Seoul (KR)

( * ) Notice: Subject to any disclaimer, the term of this patent is extended or adjusted under 35 U.S.C. 154(b) by 137 days.

(21) Appl. No.: 09/993,730

(22) Filed: Nov. 14, 2001

(65) Prior Publication Data
US 2002/0130849 A1 Sep. 19, 2002

(30) Foreign Application Priority Data
Mar. 16, 2001 (KR) ........................... 2001-13538

(51) Int. Cl.⁷ ................................ G09G 5/00
(52) U.S. Cl. ................ 345/173; 349/96; 178/18.1
(58) Field of Search ................ 345/173, 174, 345/175, 176, 177; 178/18.01, 18.1, 18.03; 349/58, 61, 96, 158

(56) References Cited

U.S. PATENT DOCUMENTS

| | | | | |
|---|---|---|---|---|
| 6,342,934 B1 | * | 1/2002 | Kameyama et al. | 349/98 |
| 6,392,727 B1 | * | 5/2002 | Larson et al. | 349/96 |
| 6,549,195 B2 | * | 4/2003 | Hikida et al. | 345/173 |
| 2001/0000961 A1 | * | 5/2001 | Hikida et al. | 345/173 |
| 2001/0031835 A1 | * | 10/2001 | Ohrui et al. | 525/329.7 |
| 2002/0033919 A1 | * | 3/2002 | Sanelle et al. | 349/122 |
| 2003/0038916 A1 | * | 2/2003 | Nakano et al. | 349/158 |
| 2003/0081151 A1 | * | 5/2003 | Tsuchihashi et al. | 349/61 |

* cited by examiner

*Primary Examiner*—Xiao Wu
(74) *Attorney, Agent, or Firm*—Brian S. Steinberger; Law Offices of Brian S. Steinberger, P.A.

(57) ABSTRACT

An improved touch panel with polarizer, a flat panel display with touch panel, and a laminating method. The improvement having an adhesive layer, provided on an upper base of the polarizer in order to manufacture a laminate structure; or dot spacers formed between transparent conductive films are formed so that substrates can be laminated to each other. The touch panel with polarizer includes: dot spacers between transparent conductive films so that substrates can be laminated to each other; the polarizer bonded to a lower sheet has an adhesive layer bonded to the touch panel causing the polarizer to be integrated with the panel, and another adhesive layer causing the polarizer to be bonded to the liquid crystal display; and the other polarizer is bonded to the liquid crystal display. A touch panel is bonded together, and a polarizer is bonded to the panel, and the liquid crystal display is bonded to an adhesive layer on the polarizer. Lightness and thinness of the touch panel with the polarizer, and the flat panel display with the touch panel is obtained. Also, loss of light transmissivity is reduced, and defects resulting from deformation of the touch panel is removed. High yield and reliability can be obtained in the laminating method.

5 Claims, 7 Drawing Sheets

TOUCH PANEL WITH POLARIZER, FLAT PANEL DISPLAY WITH THE TOUCH PANEL AND MANUFACTURING METHOD THEREOF

This invention claims the benefit of priority to Korean Patent Application No. 2001-13538 filed Mar. 16, 2001. The present invention relates to a touch panel with a polarizer integrally formed therein, a flat panel display with a touch panel integrally formed therein, and a laminating method thereof.

BACKGROUND AND PRIOR ART

A touch screen has been known as an input device incorporated into or added to a computer, a portable transmitter, a spherical or aspherical displaying apparatus, a personal digital assistant (PDA), or the like. Although the touch screen (touch panel) is one of input devices, it has features that its input operation is simple, there is little possibility of wrong operation, and it is possible to input characters with hands, as compared with the other input devices such as a mouse or a keyboard.

As for the currently used touch panel, its concern or technical trend is being changed from a general function of an input device to high reliability, provision of a new function, durability, and a detailed technique such as fabricating technique related to a design and processing of material, substance or the like. Further, a detecting method, a structure and performance of the touch panel are well known in detail.

Considering briefly the detecting method, there is a resistive touch panel that is constructed by bonding together two sheets having different resistance components arranged such that the two sheets can be isolated by spacers and contacted with each other by a pressing action. Further, there are a capacitive touch panel, an ultrasonic wave touch panel, an optical (infrared) sensor touch panel, an electromagnetic induction touch panel, etc. Since they have properties different from each other according to their signal amplification problems or resolution differences and their degrees of difficulty of designs and fabricating techniques, the detecting methods should be determined in consideration of durability, economical efficiency and the like thereof in addition to optical property, electrical property, mechanical property, environmental resistance, input property and the like.

Figure 1:
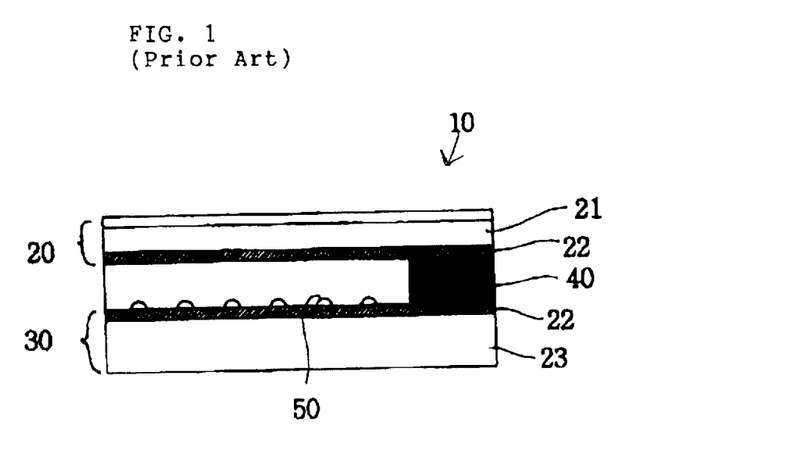
FIG. 1 is a view showing a sectional structure of a conventional touch panel.

FIG. 1 is a sectional view showing the basic constitution of a resistive touch screen 10. An upper substrate 20 and a lower substrate 30 are structurally bonded by an adhesive 40 having thickness of approximately 75 to approximately 200 $\mu$m with transparent conductive films 22 thereof faced to each other. The upper substrate 20 comes into contact with the lower substrate 30 by pressure applied upon depression for input. The upper substrate 20 is made of a PET film or a thin glass sheet, which is flexible. Since the thin glass sheet has an optical isotropy, it is used for reducing surface reflection of the substrate by attaching a polarizer onto the substrate. However, a plastic film having optical isotropy is recently available. Nevertheless, production costs, fabricating difficulty and physical property thereof is open to further improvement.

The detection of an input position is made by a structure configured such that the upper and lower substrates 20, 30 with electrodes put thereinto face each other with a gap of approximately 100 to approximately 300 $\mu$m by means of dot spacers 50, and that input signals are extracted through a connector tail. As for its operation, when the upper substrate 20 comes into contact with the lower substrate 30 on an input point and a voltage is applied between the electrodes of the lower substrate 30, a potential gradient is produced on resistive surfaces between both electrodes. The resulting voltage is read through the electrodes of the upper substrate 20 and an X-axis input position is then calculated by a controller. Subsequently, a voltage is applied between the electrodes of the upper substrate 20 and the resulting voltage is read through the electrodes of the lower substrate 30 so as to calculate a Y-axis input position. Thus, the input point is shown on the display. By repeating the above procedures at a high rate, input positions are continuously shown on the display so that characters or lines are drawn.

Required characteristics of the touch panel are ones requested by a user in accordance with multiple purposes of the products for installing the touch panel therein. In order to meet these characteristics of the touch panel, the structure of the touch panel may be accepted to a certain extent through a partial structural modification of the touch panel. However, it is difficult to accept all the characteristics. In addition, there is a limit on acceptance of the required characteristics by means of the resistive touch panel only. Therefore, there is a need to select an optimal one of the structures or detecting methods of the touch panel suitable for the various required characteristics.

In view of the required characteristics, the resistive touch panel is suitable for daily life of the general public where the price, productivity, character writing and the like thereof have priority over all other things. An elastic wave touch panel is suitable for use in industrial equipments where the durability, optical property, insulating property, and the like thereof are of importance. Therefore, the characteristics of the touch panel depend entirely on selection of the touch panel by the user.

On the other hand, although there are many cases where an LCD is used for a display, the LCDs are classified according to usage of products because there are many types of LCDs. In order to classify the LCDs, various classifying manners are taken into consideration.

For example, it is possible to classify the LCDs into monochrome and color types, frontlight and backlight types, or STN and TFT types in view of their structures. In particular, due to the improvements of high resolution of the TFT and color yield of the frontlight LCD, there is a great demand for the touch panel to be mounted on the LCD.

In general, the length extending from an outermost periphery of a visual area of the touch panel to an outer periphery of the touch panel is called an inactive area. The miniaturization, thinness, and improvement in an effective area ratio of a screen of the products are needed. The inactive area of the LCD has been largely reduced, so that the inactive area of the touch panel should be necessarily reduced due to a limitation on an assembly structure of them, in which the dimension of the touch panel should be smaller than that of the LCD. However, the simple reduction of the inactive area of the touch screen produces problems that linearity and insulation shield of the electrodes are lowered, and it is likely that noise is produced due to easy intrusion of an electromagnetic wave and static electricity. Complementary technologies for the above problems have been continuously proposed.

The resistive touch panel is suitable for the daily life of the general public, as described above. However, the resistive touch panels still have a problem of whether it can exhibit an expected performance in combination with a display such as an LCD and meet various demands (required characteristics). This problem also applies to the other types of the touch panels.

Figure 2:
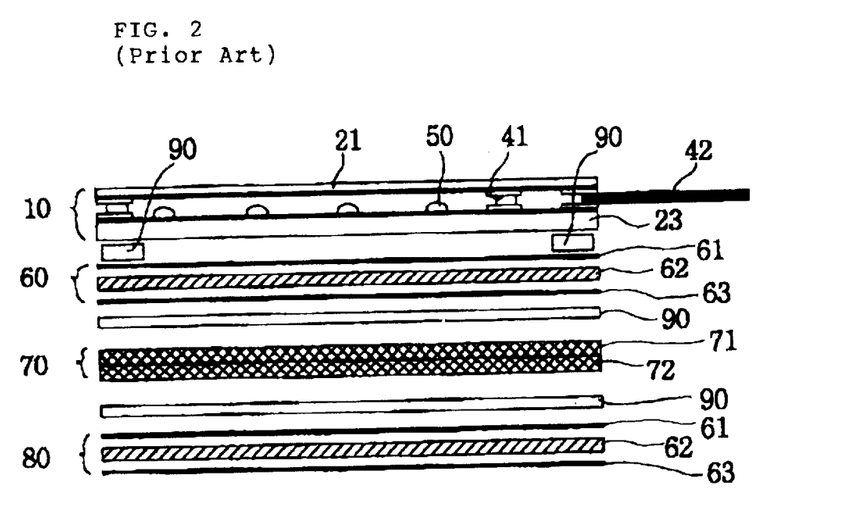
FIG. 2 is a schematic sectional view of a laminate structure in which the touch panel is attached to a flat panel display.

FIG. 2 schematically shows a sectional structure manufactured by a technology of laminating the resistive touch panel onto the flat panel display according to the required characteristics thereof.

The structure of FIG. 2 is a flat panel display constructed in such a manner that a polarizer 60 is put on the bottom of a touch panel 10 comprised of an upper sheet 21 and a lower sheet 23, a liquid crystal display device 70 is put on the bottom of the polarizer 60, another polarizer 80 is then put on the bottom of the liquid crystal display device 70, and they are finally laminated together.

Here, the polarizers 60, 80 serve to convert visible rays into linearly polarized light on both sides of the liquid crystal display device 70 of the flat panel display. To this end, the polarizers 60, 80 are generally constructed by laminating together predetermined films such as transparent conductive films comprised of an upper base 61, an optical film base 62 and a lower base 63.

The technology of laminating the touch panel 10 onto the flat panel display by using the polarizers 60, 80 aims at enhancing light transmissivity as good as possible while maintaining all optical axes and simultaneously thinness and lightness thereof in view of its laminate structure. Various methods by which the maintenance of the optical axes can be achieved by measures such as use of optically isotropic materials and the light transmissivity can also be improved in view of the sectional structure by using optimal materials are advantageous to the thinness, miniaturization, and lightness thereof. The application of the laminate structure is taken into consideration at least within the range favorable to the thinness, miniaturization, and lightness thereof.

The concrete examples of the design of the touch panel are well known in Korean Patent Laid-Open Publication Nos. 1998-41100 and 1996-24536, etc. According to this technology, the polarizers have not been separately disposed, but integrally formed on the touch panel (the bottom thereof) while performing original functions of the polarizers. Although the technology has provided useful designs advantageous to the thinness, miniaturization, lightness, process improvements and low unit costs thereof, there has still been a problem of whether the light transmissivity, yield and reliability of the touch panel can be reliably maintained as the polarizers become integrally formed on the touch panel.

Figure 3:
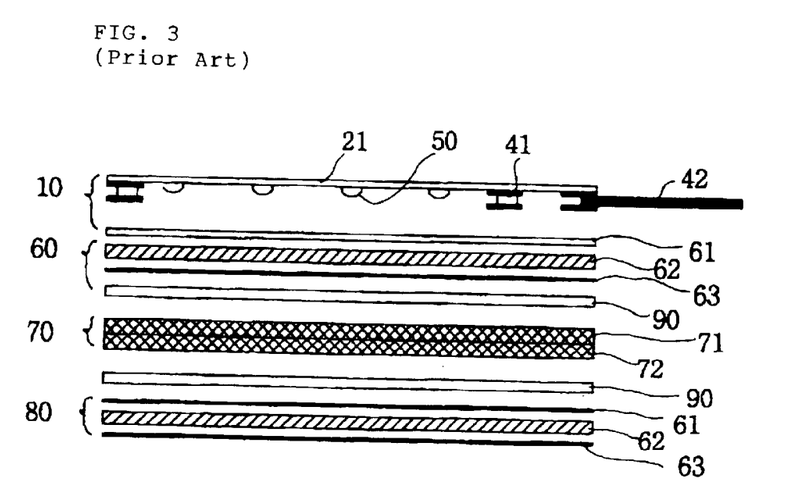
FIG. 3 is a schematic view of the conventional touch panel with a polarizer integrally formed therein.
Figure 4:
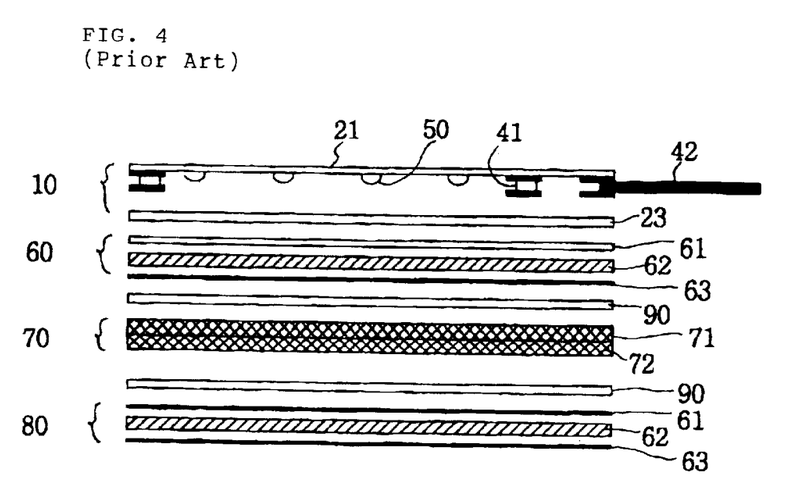
FIG. 4 is a schematic view of the other conventional touch panel with a polarizer integrally formed therein or a flat panel display with the touch panel integrally formed therein.

Cases where polarizers made of different bases are incorporated into or added to the touch panel, i.e., new polarizers themselves or a structure in which the new polarizers are used, have been well known. The above is schematically shown in FIGS. 3 and 4. The technology shown in these figures is used to more widely apply both the advantageous effects, which are obtained by incorporating the polarizer 60 into the touch panel 10, and the general results, which are produced in connection with selection of the bases of the polarizers 60, 80, to the laminate structures of the touch panel 10 and the flat panel display.

Examples of the laminate structure of the polarizers, the touch panel and the flat panel display, which are shown in the sectional structure of FIGS. 3 and 4, are as follows:

1. A structure of the polarizers 60, 80, including a laminate structure of the upper base 61, the optical film base 62 and the lower base 63.

2. A structure of the integrally formed polarizer 60, in which the transparent conductive film has been used on the polarizer 60 comprised of the lower base 63, the optical film base 62 and the upper base 61 from below, instead of the optically isotropic film.

3. A structure of the touch panel with the polarizer integrally formed therein, including the polarizer 60 with the transparent conductive film integrally formed therein, comprised of the lower base 63, the optical film base 62 and the conductive film from below; and the touch panel 10, comprised of the transparent conductive film and the upper sheet 21 which is constructed such that dot spacers 50 are applied to a bottom surface thereof and that electrodes 41 and a tail 42 are installed therein.

4. A structure of the touch panel with the polarizer integrally formed therein, including the polarizer 60 with the transparent conductive film integrally formed therein, comprised of the lower base 63, the optical film base 62, the upper base 61 and the conductive film from below; and the touch panel 10, comprised of the transparent conductive film and the upper sheet 21 which is constructed such that dot spacers 50 are applied to a bottom surface thereof and that the electrodes 41 and the tail 42 are installed therein.

5. A structure of the flat panel display with the touch panel integrally formed therein, including the polarizer 80 comprised of the lower base 63, the optical film base 62 and the upper base 61 from below; the liquid crystal display device 70 comprised of a lower glass sheet 72, a liquid crystal disposed between the lower glass sheet 72 and an upper glass sheet 71, and the upper glass sheet 71 from below, on the polarizer 80; the polarizer 60 with the transparent conductive film integrally formed therein, comprised of the lower base 63, the optical film base 62 and the transparent conductive film from below, on the liquid crystal display device 70; and the touch panel, comprised of the transparent conductive film and the upper sheet 21 which is constructed such that dot spacers 50 are applied to a bottom surface thereof and that the electrodes 41 and the tail 42 are installed therein.

6. A structure of the flat panel display with the touch panel integrally formed therein, including the polarizer 80 comprised of the lower base 63, the optical film base 62 and the upper base 61 from below; the liquid crystal display device 70 comprised of a lower glass sheet 72, a liquid crystal disposed between the lower glass sheet 72 and an upper glass sheet 71, and the upper glass sheet 71 from below, on the polarizer 80; the polarizer 60 with the transparent conductive film integrally formed therein, comprised of the lower base 63, the optical film base 62, the upper base 61 and the transparent conductive film from below, on the liquid crystal display device 70; and the touch panel, comprised of the transparent conductive film and the upper sheet 21 which is constructed such that dot spacers 50 are applied to the bottom surface thereof and that the electrodes 41 and the tail 42 are installed therein.

In the same as the conventionally designed structure, the structure of the polarizer with the transparent conductive film integrally formed therein, the touch panel with the polarizer integrally formed therein, the flat panel display with the touch panel integrally formed therein, or the like shown in the figures aims at diverse laminate structures of the transparent conductive film and further at thinness, miniaturization and lightness in view of the laminate structure thereof, in order to enhance the light transmissivity as good as possible while maintaining the optical axes.

However, in order to fabricate the laminate structure of the touch panel with the polarizer integrally formed therein, an issue as to how to apply or harmonize a process technology thereof to or with the laminate structure for accomplishing the touch panel with the polarizer integrally formed therein is more important than the modification of the bases of the polarizer and the laminate structure of the touch panel. Substantially, the process technology has caused these technical objectives to be limited.

In connection with the lamination process technology, the problems of the laminate structure of the conventional polarizer, the touch panel and the flat panel display, and the structural limitation thereof will be described below.

Figure 5:
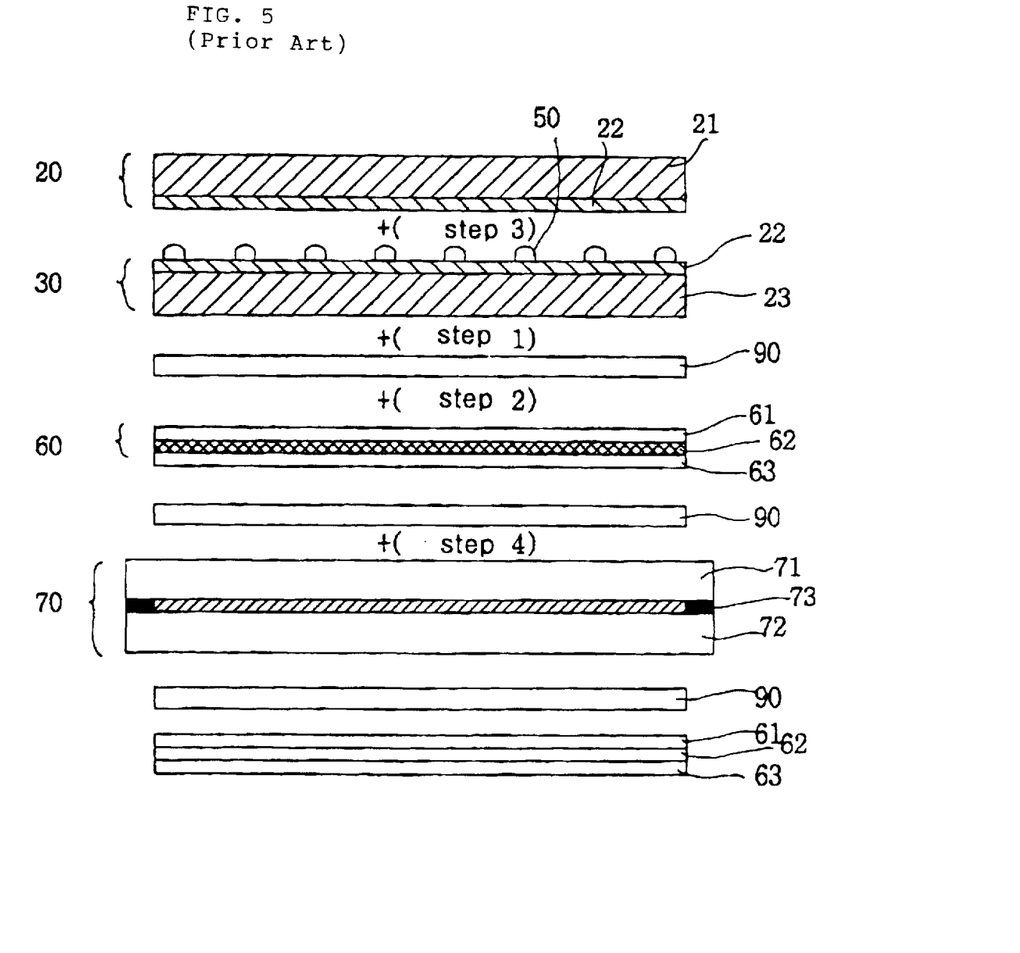
FIG. 5 is a schematic view illustrating a laminate process of the other conventional touch panel with a polarizer integrally formed therein or flat panel display with the touch panel integrally formed therein.

FIG. 5 shows schematically lamination processes in which the touch panel with the polarizer integrally formed therein is added to the flat panel display. First, a double-faced adhesive sheet 90 having an area similar to the sizes of the polarizer 60 and the touch panel 10 is beforehand prepared and one face of the double-faced adhesive sheet 90 is bonded to the lower sheet 23 of the touch panel 10 (step 1). After one face of the double-faced adhesive sheet 90 has been bonded to the lower sheet 23 of the touch panel 10, the other face of the double-faced adhesive sheet 90 is bonded to the upper base 61 of the polarizer 60 (step 2). After the above step has been completed, the lower sheet 23 of the touch panel 10 and the lower base 61 of the polarizer 60 are combined together with each other by the double-faced adhesive sheet 90. Then, by bonding the upper sheet 21 and the lower sheet 23 of the touch panel 10 together, the upper substrate 20 and the lower substrate 30 are combined together, and thus, the integrated touch panel 10 is accomplished (step 3). In a case where the touch panel 10 with the polarizer integrally formed therein is laminated (bonded together) onto the flat panel display, the touch panel is laminated onto the top of the flat panel display in such a state where the same double-faced adhesive sheet 90 that has used in the above steps is interposed between the polarizer 60 and the upper glass sheet 71 of the liquid crystal display device 70. In the same way, the polarizer 80 is bonded together to the lower glass sheet 72 with the double-faced adhesive sheet 90 interposed therebetween, and the touch panel 10 is then laminated onto the flat panel display (step 4). Most of the above lamination processes (steps) have an atmosphere in which appropriate heat and laminating pressure can be transferred. Although a part of the lamination processes may be changed, the process for bonding together the polarizer 60 and the lower sheet 23 of the touch panel is performed before the process for bonding the upper and lower sheet 21, 23 of the touch panel 10 in a case where the double-faced adhesive sheet 90 is used. The reason is that distortion of the touch panel, dislocation of the upper and lower substrates, and heat deformation cannot be avoided due to the pressure applied thereto if the touch panel 10 is bonded to the polarizer 60 in a state where the upper and lower sheets 21, 23 have been bonded together into the touch panel.

Figure 6:
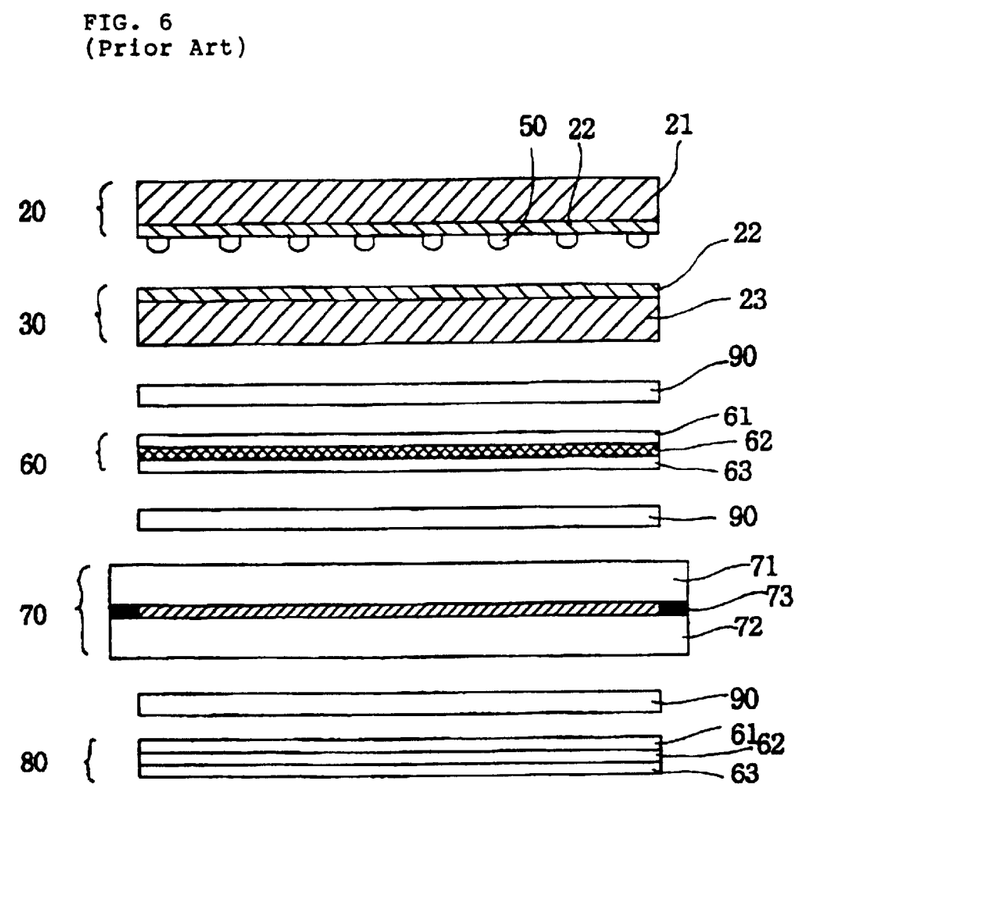
FIG. 6 is a schematic view illustrating the other laminating process.

FIG. 6 shows schematically lamination processes in which the other touch panel with the polarizer integrally formed therein is added to the flat panel display. Here, the dot spacers 50 for insulating the upper and lower substrates 20, 30 from each other are formed on the upper sheet 21 of the upper substrate 20 rather than on the lower substrate 30.

Such a structure is considered as the structure for making a preparation against a problem that may be produced during the lamination processes because the dot spacers 50 are placed on the lower substrate 30 of the touch panel 10, that is, a likelihood that a desired insulation within the active area cannot be obtained since the dot spacers 50 is pressed down (collapsed) by the pressure for pressing down the dot spacers 50 during the above steps 1 and 2 in which the polarizer 60 is pressed from the top of the lower substrate 30.

In case of this structure, however, the shock applied upon contact with the upper substrate 20 is greater than that in the lower substrate 30. Thus, it is more likely that the dot spacers 50 will be removed from the transparent conductive film 22.

Further, there are other problems in that planar bonding uniformity cannot be ensured because the processes should be performed twice if the double-faced adhesive sheet 90 is used upon bonding of the touch panel 10 and the polarizer 60, and in that deterioration of the transmissivity and the yield can be produced due to formation of minute air gaps between the contact surfaces during the lamination processes.

When the touch panel with the polarizer integrally formed therein constructed as such in the form of a laminate structure is incorporated into the flat panel display, the laminate structure of the touch panel with the polarizer integrally formed therein and the flat panel display, wherein the light transmissivity should be enhanced as good as possible while maintaining optical axes and the laminate structure is advantageous in view of thinness and lightness thereof, has a strong likelihood that fatal defects such as loss of the light transmissivity and deformation of the active area of the touch panel resulting from the air gaps will be produced during the lamination process. Further, since the laminating method thereof should be prepared against the above likelihood, the yield and reliability of the products are very dependent on the lamination processes. Thus, the conventional structure or method has remained at a lower state of the art.

SUMMARY OF THE INVENTION

An object of the present invention is to provide a laminate structure of a touch panel with a polarizer integrally formed therein or a flat panel display with the touch panel incorporated thereinto that is advantageous in view of thinness and lightness thereof.

Another object of the present invention is to provide a polarizer suitable for the touch panel with the polarizer integrally formed therein.

A further object of the present invention is to improve light transmissivity by reducing air gaps produced in the laminate structure of the touch panel with the polarizer integrally formed therein.

A still further object of the present invention is to provide a method wherein defects in an active area of the touch panel can be reduced when fabricating the touch panel with the polarizer integrally formed therein and laminating the touch panel into the flat panel display.

According to an aspect of the present invention for achieving the above objects, there is provided a touch panel with a polarizer integrally formed therein, which comprises a touch panel including an upper substrate having an upper sheet and a transparent conductive film formed below the upper sheet, a lower substrate having a transparent conductive film like the transparent conductive film of the upper substrate and a lower sheet formed below the transparent conductive film, dot spacers for insulating the upper and lower substrates from each other, and electrodes for applying voltage to a resistive film disposed between the upper and lower sheets; and a polarizer bonded to the lower sheet of the touch panel for converting visual light to linearly polarized light, characterized in that: the polarizer is sequentially comprised of an upper base, an optical film base and a lower base; and an adhesive layer, which is bonded together to the lower sheet of the touch panel and causes the polarizer to be integrated with the touch panel in order to manufacture a laminate structure thereof, is further provided on an upper face of the upper base of the polarizer.

According to another aspect of the present invention, there is also provided a touch panel with a polarizer integrally formed therein, which comprises a touch panel including an upper substrate having an upper sheet and a transparent conductive film formed below the upper sheet, a lower substrate having a transparent conductive film like the transparent conductive film of the upper substrate and a lower sheet formed below the transparent conductive film, dot spacers for insulating the upper and lower substrates from each other, and electrodes for applying voltage to a resistive film disposed between the upper and lower sheets; and a polarizer bonded to the lower sheet of the touch panel for converting visual light to linearly polarized light, characterized in that: the dot spacers formed between the respective transparent conductive films of the upper and lower sheets are formed on the lower sheet so that the upper and lower substrates can be laminated to each other; the polarizer is sequentially comprised of an upper base, an optical film base and a lower base; an adhesive layer, which is bonded together to the lower sheet of the touch panel and causes the polarizer to be integrated with the touch panel in order to manufacture a laminate structure of the touch panel, is provided on an upper face of the upper base of the polarizer; and another adhesive layer for causing the polarizer incorporated into the touch panel to be bonded to an upper glass sheet of a liquid crystal display device is provided on a lower face of the lower base of the polarizer.

According to a further aspect of the present invention, there is also provided a flat panel display with a touch panel integrally formed therein, which comprises a touch panel including an upper substrate having an upper sheet and a transparent conductive film formed below the upper sheet, a lower substrate having a transparent conductive film like the transparent conductive film of the upper substrate and a lower sheet formed below the transparent conductive film, dot spacers for insulating the upper and lower substrates from each other, and electrodes for applying voltage to a resistive film disposed between the upper and lower sheets; a polarizer bonded to the lower sheet of the touch panel for converting visual light to linearly polarized light; a liquid crystal display device bonded to the polarizer and including an upper glass sheet, liquid crystals and a lower glass sheet; and another polarizer bonded to the lower glass sheet of the liquid crystal display device, characterized in that: the dot spacers formed between the respective transparent conductive films of the upper and lower sheets are formed on the lower sheet so that the upper and lower substrates can be laminated to each other; the polarizer bonded to the lower sheet is sequentially comprised of an upper base, an optical film base and a lower base, and further comprises an adhesive layer, on an upper face of the upper base thereof, which is bonded together to the lower sheet of the touch panel and causes the polarizer to be integrated with the touch panel, and another adhesive layer for causing the polarizer incorporated into the touch panel to be bonded to an upper glass sheet of the liquid crystal display device, on a lower face of the lower base thereof, and the polarizer bonded to the lower glass sheet of the liquid crystal display device is sequentially comprised of an adhesive layer, an upper base, an optical film base and a lower base, is then bonded to the lower glass sheet of the liquid crystal display device.

According to a still further aspect of the present invention, there is provided a method for manufacturing a flat panel display with a touch panel integrally formed therein by bonding one face of a polarizer to a lower sheet of the touch panel, forming a laminate structure of the touch panel with the polarizer integrally formed therein, and bonding the opposite face of the polarizer of the touch panel with the polarizer integrally formed therein to an upper glass sheet of a liquid crystal display device, comprising the steps of: forming dot spacers on a transparent conductive film of the lower sheet and bonding upper and lower substrates of the touch panel with transparent conductive films of upper and lower sheets facing each other; bonding the lower sheet of the touch panel to an adhesive layer formed on one face of the polarizer; and bonding the upper glass sheet of the liquid crystal display device to an adhesive layer formed on the opposite face of the polarizer bonded with the lower sheet.

According to the touch panel with the polarizer integrally formed therein of the present invention, the constitution thereof is advantageous in view of lightness, miniaturization and thinness thereof. Further, according to the process of laminating the touch panel with the polarizer integrally formed therein and the flat panel display with the touch panel integrally formed therein, loss of the light transmissivity can be reduced and defects resulting from deformation of the active area of the touch panel can be simultaneously removed by preventing formation of minute air gaps beforehand. Furthermore, yield and reliability of the laminating process can be highly maintained.

Further objects and advantages of this invention will be apparent from the following detailed description of the presently preferred embodiments which are illustrated schematically in the accompanying drawings.

DETAILED DESCRIPTION OF THE INVENTION

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Hereinafter, the present invention will be explained in detail with reference to FIGS. 7 to 10 of the accompanying drawings.

Figure 7:
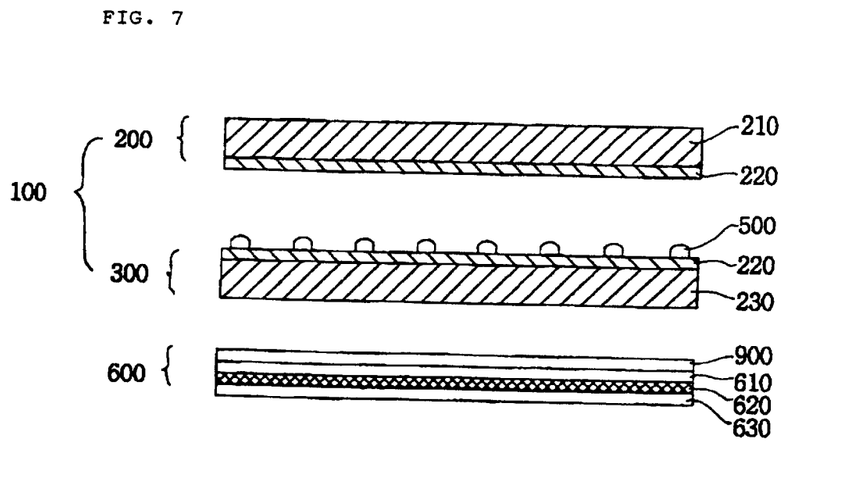
FIG. 7 is a view schematically showing a laminate structure of a touch panel with a polarizer integrally formed therein according to the present invention.

FIG. 7 is a schematic view of a laminate structure of a touch panel with a polarizer integrally formed therein according to the present invention.

The touch panel with the polarizer integrally formed therein comprises an upper substrate 200 having an upper sheet 210 and a transparent conductive film 220 formed below the upper sheet 210; a lower substrate 300 having a transparent conductive film 220 like the transparent conductive film 220 of the upper substrate 200 and a lower sheet 230 formed below the transparent conductive film 220; dot spacers 500 for insulating the upper and lower substrates 200, 300 from each other; and electrodes for applying voltage to a resistive film disposed between the upper and lower sheets 210, 230. A polarizer 600, which is bonded together to the lower sheet 230 of the touch panel 100 and converts visual rays into linearly polarized light, comprises an upper base 610, an optical film base 620 and a lower base 630 and is used to be bonded together with the lower sheet 230 of the touch panel 100.

Here, the polarizer 600 does not necessarily have a laminate structure of the upper base 610, an optical film base 620 and a lower base 630.

In a case where the polarizer 600 is sequentially comprised of the upper base 610, the optical film base 620 and the lower base 630, an adhesive layer 900, which is bonded together to the lower sheet 230 and causes the polarizer 600 to be integrated with the touch panel 100 in order to construct the laminate structure, is provided on an upper face of the upper base 610. Here, the adhesive layer 900 can be entirely or partly formed on the upper base 610.

Figure 8:
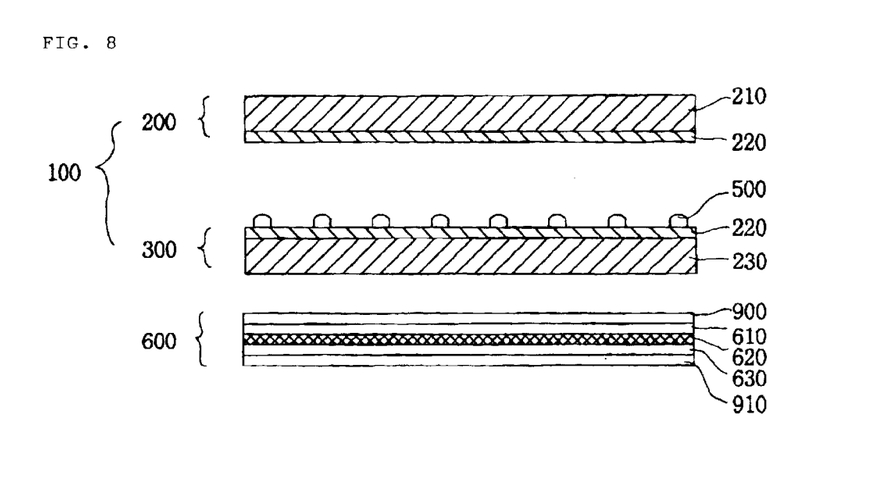
FIG. 8 is a view schematically showing another laminate structure of a touch panel with a polarizer integrally formed therein according to the present invention.

FIG. 8 is a schematic view of a laminate structure of another touch panel with a polarizer integrally formed therein according to the present invention.

The touch panel with the polarizer integrally formed therein comprises the upper substrate 200 having the upper sheet 210 and the transparent conductive film 220 formed below the upper sheet 210; the lower substrate 300 having the transparent conductive film 220 like the transparent conductive film 220 of the upper substrate 200 and the lower sheet 230 formed below the transparent conductive film 220; the dot spacers 500 for insulating the upper and lower substrates 200, 300 from each other; and the electrodes for applying voltage to the resistive film disposed between the upper and lower sheets 210, 230. The polarizer 600, which is bonded together to the lower sheet 230 of the touch panel 100 and converts visual rays into linearly polarized light, comprises the upper base 610, the optical film base 620 and the lower base 630 and is used to be bonded together with the lower sheet 230.

Here, the polarizer 600 does not necessarily have a laminate structure of the upper base, the optical film base and the lower base. The dot spacers 500, which are formed between the respective transparent conductive films 220 of the upper and lower sheets 210, 230, are arranged on the lower sheet 230. The upper and lower substrates 200, 300 are laminated with the dot spacers 500 interposed between them.

In a case where the polarizer 600 is sequentially comprised of the upper base, the optical film base and the lower base, an adhesive layer 900, which is bonded together to the lower sheet 230 of the touch panel 100 and causes the polarizer 600 to be integrated with the touch panel 100 in order to construct the laminate structure, is provided on the upper face of the upper base 610 of the polarizer 600.

Another adhesive layer 910 for bonding an upper glass sheet 710 of a liquid crystal display device 700 and the polarizer 600 integrated with the touch panel is further provided on a lower face of the lower base 630 of the polarizer 600.

Here, the adhesive layers 900, 910 can be entirely or partly formed on an arbitrary one of the bases.

Figure 9:
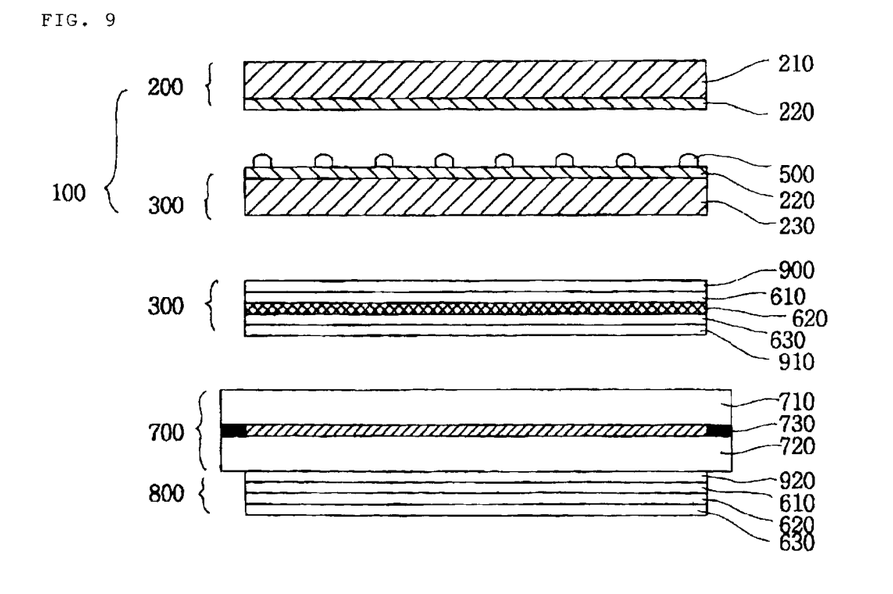
FIG. 9 is a view schematically showing a laminate structure of a touch panel with a polarizer integrally formed therein or a flat panel display with the touch panel integrally formed therein.

FIG. 9 is a schematic view of a laminate structure of a further touch panel with a polarizer integrally formed therein or a flat panel display with the touch panel integrally formed therein.

The touch panel with the polarizer integrally formed therein according to the present invention is applied to the flat panel display with the touch panel integrally formed therein, comprising: the touch panel 100 including the upper substrate 200 having the upper sheet 210 and the transparent conductive film 220 formed below the upper sheet 210, the lower substrate 300 having the transparent conductive film 220 like the transparent conductive film 220 of the upper substrate 200 and the lower sheet 230 formed below the transparent conductive film 220, the dot spacers 500 for insulating the upper and lower substrates 200, 300 from each other, and the electrodes for applying voltage to the resistive film disposed between the upper and lower sheets 210, 230; the polarizer 600 bonded together to the lower sheet 230 of the touch panel 100 for converting visual rays into linearly polarized light; the liquid crystal display device 700 which is sequentially comprised of the upper glass sheet 710 bonded together with the polarizer 600, liquid crystals 730 and a lower glass sheet 720; and another polarizer 800 bonded together with the lower glass sheet 720 of the liquid crystal display device 700.

Here, the dot spacers 500 formed between the respective transparent conductive films 220 of the upper and lower sheets 210, 230 are arranged on the lower sheet 230, and thus, the upper and lower substrates 200, 300 are bonded together with the dot spacers interposed between them. In a case where the polarizer 600 bonded together on the lower sheet 230 is sequentially comprised of the upper base, the optical film base and the lower base, the adhesive layer 900 for bonding together with the lower sheet 230 of the touch panel 100 and causing the polarizer 600 to be bonded with the touch panel 100 is formed on the upper face of the upper base 610 and the adhesive layer 910 for causing the upper glass sheet 710 of the liquid crystal display device 700 to be bonded together with the polarizer integrated with the touch panel is also formed on the lower face of the lower base 630 of the polarizer 600. Further, the polarizer 800 for contacting and bonding with the lower glass sheet 720 of the liquid crystal display device 700 is sequentially comprised of the adhesive layer 920, the upper base 610, the optical film base 620 and the lower base 630 and bonded together with the lower glass sheet 720 of the liquid crystal display device 700.

Here, the polarizer 800 bonded together with the lower glass sheet 720 is not necessarily constructed to comprise the upper base, the optical film base and the lower base.

Here, the adhesive layers 900, 910, 920 can be entirely or partly formed on an arbitrary one of the bases.

The laminate structures of the touch panel with the polarizer integrally formed therein and the flat panel display with the touch panel integrally formed therein according to the present invention as shown in FIGS. 7 to 9 are manufactured in the following lamination processes.

1. The touch panel with the polarizer integrally formed therein shown in FIG. 7 is manufactured by the steps of forming the dot spacers 500 on the transparent conductive film 220 of the lower sheet 230 and bonding the upper and lower substrates 200, 300 with the transparent conductive films 220 of the upper and lower sheets 210, 230 facing each other, and then bonding the lower sheet 230 of the touch panel 100 to the adhesive layer 900 formed on one face of the polarizer 600.

2. The touch panel with the polarizer integrally formed therein shown in FIG. 8 is manufactured by the same steps of bonding the substrates of the touch panel and bonding the touch panel and the polarizer as the above method.

3. The flat panel display with the touch panel integrally formed therein shown in FIG. 9 is manufactured by the steps of forming the dot spacers 500 on the transparent conductive film 220 of the lower sheet 230 and bonding the upper and lower substrates 200, 300 with the transparent conductive films 220 of the upper and lower sheets 210, 230 facing each other, bonding the lower sheet 230 of the touch panel 100 to the adhesive layer 900 formed on one face of the polarizer 600, and bonding the upper glass sheet 710 of the liquid crystal display device 700 to the adhesive layer 910 formed on the opposite face of the polarizer 600 bonded with the lower sheet 230.

The lamination processes according to the above items 1 to 3 commonly progress in the sequences of manufacturing the touch panel in whole by first bonding the upper and lower substrates 200, 300 of the touch panel, and then bonding the polarizer 600 and the lower sheet 230 of the touch panel. These sequences result from the formation of the dot spacers 500 onto the transparent conductive film of the touch panel. That is, if the upper and lower substrates of the touch panel 100 are bonded in whole, air gaps thus formed between the upper and lower substrates function as buffers for absorbing pressure applied to the dot spacers 500. Consequently, the polarizer 600 and the touch panel 100 can be bonded together without any deformation of the active area that results from depression of the dot spacers 500. The process of forming the dot spacers 500 onto the transparent conductive film 220 of the lower sheet 230 is not novel, as explained above.

More importantly, since contrary to the present invention, the conventional laminate structure in which the dot spacers 500 have been formed on the transparent conductive film of the lower sheet 230 has a problem of a lamination process in that since the upper and lower substrates 200, 300 of the touch panel cannot be beforehand bonded in whole due to characteristics of the adhesive and the lamination processes when it is structurally bonded with the polarizer 600, it cannot acquire a profit or gain corresponding thereto (when the dot spacers are formed on the lower sheet). However, in the present invention, the upper and lower substrates of the touch panel can be first bonded together and they can be later bonded with the polarizer 600, since the adhesive layer 900 is provided on the upper face of the polarizer 600.

Further, in a case where the touch panel in which the upper and lower substrates have been beforehand bonded by using the ordinary double-faced adhesive sheet without the adhesive layer 900 of the polarizer 600 used in the present invention is fixed to the polarizer, rapid changes in quality of the transparent conductive film and rapid deformation of the dot spacers are produced. Thus, it is difficult to anticipate the manufacture of the high precision touch panel with the polarizer integrally formed therein.

On the other hand, the present invention is characterized in that the lower substrate 300 having the dot spacers 500 formed on the lower sheet 230 thereof is first manufactured, that the upper substrate 200 attached on the lower substrate is then bonded to the lower substrate, and that the desired laminate structure of the touch panel with the polarizer integrally formed therein or the flat panel display with the touch panel integrally formed therein is thereafter manufactured. It has been already explained that there are no problems of the depression of the dot spacers 500 during the lamination processes thereof since the adhesive layers 900, 910 are beforehand formed on both faces of the polarizer 600 to this end.

In addition to the foregoing effect resulting from the adhesive layers 900, 910 on the polarizer 600, the present invention has another effect in connection with the formation of the adhesive layers.

Figure 10:
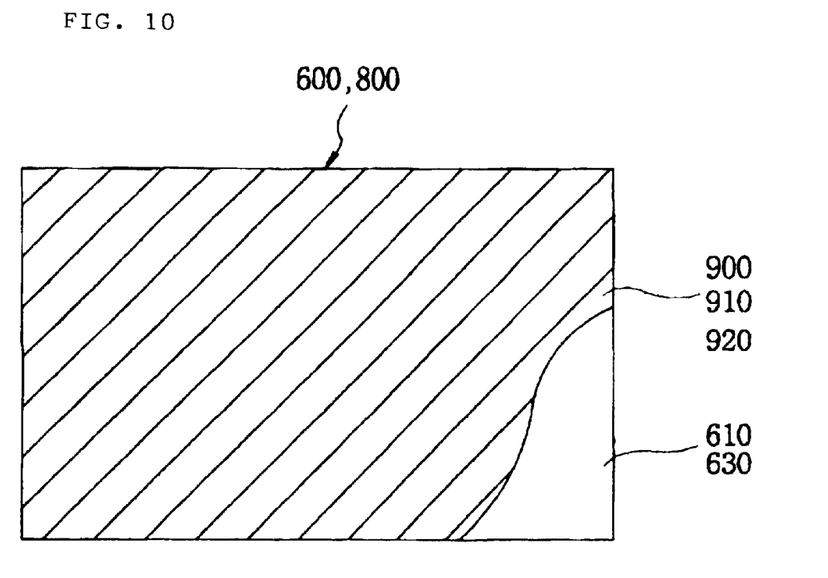
FIG. 10 is a view showing a depositing area of a bonded layer on the polarizer according to the present invention.

FIG. 10 is a typical example or model of the adhesive layers 900, 910, 920 formed on the polarizers 600, 800. When the upper bases of the polarizers 600, 800 have a rectangular planar configuration (the material property of the upper base is independent of the application of the adhesive layers), the adhesive layers 900, 910, 920 can be deposited onto the entire face of the plane. It is not difficult to form an adhesive layer onto an arbitrary face (material). Although FIG. 10 is an example in which the adhesive layer for covering the entire region of the upper or lower base has been formed, a partial deposition along an outermost periphery of the base may be considered depending on the situation. However, more stable bonding thereof can be obtained by forming the adhesive layer on the entire face thereof at a uniform thickness. In a case where the adhesive layer is deposited in such a manner that it can cover the entire face of the upper or lower base, the air gaps resulting from separation between and unstable bonding of the lower sheet of the touch panel and the an upper adhesive face of the polarizer can be completely removed. The air gaps formed on a bonding surface between the touch panel and the polarizer have a great influence on the light transmissivity.

Therefore, the adhesive layer on the polarizer can prevent inactivation of the active area and damage of the transparent conductive film, which can be produced by the depression of the dot spacers during the lamination process, and it can reduce the loss of the light transmissivity due to the air gaps between the touch panel and the polarizer. Accordingly, the improvement of the light transmissivity can be obtained from stability of the laminate structure except mechanical properties of the bases to be laminated.

Likewise, in case of the flat panel display with the touch panel integrally formed therein, the loss of the light transmissivity can be reduced since entire attachment of the polarizer can be made even in the active area where image data for the liquid crystal display device are produced.

The present invention is advantageous in view of thinness, miniaturization and lightness since the laminate structure can be always obtained through fine deposition of the adhesive layer when manufacturing the touch panel with the polarizer integrally formed therein or the flat panel display with the touch panel incorporated thereinto.

According to the present invention, there are advantages in that thinness and lightness thereof can be obtained and that the loss of the light transmissivity resulting from the air gaps formed in the bonding surface between the touch panel and the polarizer can be reduced, when manufacturing the touch panel with the polarizer integrally formed therein or the flat panel display with the touch panel incorporated thereinto. Further, there is another advantage in that the damage of the active area and the transparent conductive film resulting from the depression of the dot spacers of the touch panel during the lamination process can be prevented. Furthermore, in case of the flat panel display with the touch panel integrally formed therein, there is an advantage in that the loss of the light transmissivity can be reduced since entire attachment of the polarizer can be made even in the active area where image data for the liquid crystal display device are produced. In addition, high yield of the products can be obtained and mass production of the highly reliable products can be made.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An improved touch panel with a polarizer integrally formed therein, which comprises a touch panel including an upper substrate having an upper sheet and a transparent conductive film formed below said upper sheet, a lower substrate having a transparent conductive film like said transparent conductive film of said upper substrate and a lower sheet formed below said transparent conductive film, dot spacers for insulating said upper and lower substrates from each other, and electrodes for applying voltage to a resistive film disposed between said upper and lower sheets; and a polarizer bonded to said lower sheet of said touch panel for converting visual light to linearly polarized light, the improvement comprising:

said dot spacers formed between said respective transparent conductive films of said upper and lower sheets are formed on said lower sheet so that said upper and lower substrates are laminated to each other;

said polarizer sequentially having an upper base, an optical film base and a lower base;

an adhesive layer, which is bonded together to said lower sheet of said touch panel and causes said polarizer to be integrated with said touch panel in order to manufacture a laminate structure of said touch panel, is provided on an upper face of said upper base of said polarizer; and another adhesive layer for causing said polarizer incorporated into said touch panel to be bonded to an upper glass sheet of a liquid crystal display device, is provided on a lower face of said lower base of said polarizer.

2. The improved touch panel with the polarizer integrally formed therein as claimed in claim 1, wherein said upper adhesive layer of said polarizer is formed as an entirely deposited face having a constant thickness so that said upper face of said polarizer is entirely covered with said adhesive layer, and said lower adhesive layer of said polarizer is formed as an entirely deposited face having a constant thickness so that said lower face of said polarizer is entirely covered with said adhesive layer.

3. An improved flat panel display with a touch panel integrally formed therein, which comprises a touch panel including an upper substrate having an upper sheet and a transparent conductive film formed below said upper sheet, a lower substrate having a transparent conductive film like said transparent conductive film of said upper substrate and a lower sheet formed below said transparent conductive film, dot spacers for insulating said upper and lower substrates from each other, and electrodes for applying voltage to a resistive film disposed between said upper and lower sheets; a polarizer bonded to said lower sheet of said touch panel for converting visual light to linearly polarized light; a liquid crystal display device bonded to said polarizer and including an upper glass sheet, liquid crystals and a lower glass sheet; and another polarizer bonded to said lower glass sheet of said liquid crystal display device, the improvement comprising:

said dot spacers formed between said respective transparent conductive films of said upper and lower sheets are formed on said lower sheet so that said upper and lower substrates are laminated to each other;

said polarizer bonded to said lower sheet sequentially having an upper base, an optical film base and a lower base, and further having an adhesive layer, on an upper face of said upper base thereof, which is bonded together to said lower sheet of said touch panel and causes the polarizer to be integrated with said touch panel, and another adhesive layer for causing said polarizer incorporated into said touch panel to be bonded to said upper glass sheet of said liquid crystal display device, on a lower face of said lower base thereof; and said polarizer bonded to said lower glass sheet of said liquid crystal display device sequentially having an adhesive layer, an upper base, an optical film base and a lower base, is then bonded to said lower glass sheet of said liquid crystal display device.

4. The improved flat panel display with the touch panel integrally formed therein as claimed in claim 3, wherein said adhesive layer disposed on said upper face of said polarizer is formed as an entirely deposited face having a constant thickness so that said upper face of said polarizer is entirely covered with said adhesive layer.

5. An improved method for manufacturing a flat panel display with a touch panel integrally formed therein by bonding one face of a polarizer to a lower sheet of said touch panel, forming a laminate structure of said touch panel with said polarizer integrally formed therein, and bonding the opposite face of said polarizer of said touch panel with said polarizer integrally formed therein to an upper glass sheet of a liquid crystal display device, the improvement comprising the steps of:

forming dot spacers on a transparent conductive film of said lower sheet and bonding upper and lower substrates of said touch panel with transparent conductive films of upper and lower sheets facing each other;

bonding said lower sheet of said touch panel to an adhesive layer formed on one face of said polarizer; and bonding said upper glass sheet of said liquid crystal display device to an adhesive layer formed on the opposite face of said polarizer bonded with said lower sheet.

* * * * *